(12) United States Patent
Cumbie et al.

(10) Patent No.: US 10,753,815 B2
(45) Date of Patent: Aug. 25, 2020

(54) RELATIVE PRESSURE SENSOR

(71) Applicant: Hewlett-Packard Development Company, L.P., Houston, TX (US)

(72) Inventors: Michael W. Cumbie, Albany, OR (US); Chien-Hua Chen, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 54 days.

(21) Appl. No.: 15/772,031

(22) PCT Filed: Oct. 28, 2015

(86) PCT No.: PCT/US2015/057728
§ 371 (c)(1),
(2) Date: Apr. 27, 2018

(87) PCT Pub. No.: WO2017/074334
PCT Pub. Date: May 4, 2017

(65) Prior Publication Data
US 2018/0321100 A1    Nov. 8, 2018

(51) Int. Cl.
*G01L 7/08* (2006.01)
*G01L 9/06* (2006.01)
*B41J 2/175* (2006.01)
*G01L 27/00* (2006.01)
*G01L 19/14* (2006.01)
(Continued)

(52) U.S. Cl.
CPC ............ *G01L 7/08* (2013.01); *B41J 2/17513* (2013.01); *B41J 2/17556* (2013.01); *G01L 9/0055* (2013.01); *G01L 9/06* (2013.01); *G01L 19/0007* (2013.01); *G01L 19/149* (2013.01); *G01L 27/005* (2013.01)

(58) Field of Classification Search
CPC ........... B81B 2201/0264; G01L 9/0042; G01L 9/0072; G01L 9/0073; G01L 7/00; G01L 9/0045; G01L 19/00; G01L 19/146
See application file for complete search history.

(56) References Cited

U.S. PATENT DOCUMENTS 3,440,873 A * 4/1969 Eichelberger ......... G01L 9/0005
73/862.68
4,625,560 A * 12/1986 Sanders ................ G01L 9/0073
331/65
(Continued)

FOREIGN PATENT DOCUMENTS

CN       104310299        1/2015
DE    102014207480 A1   10/2015
(Continued)

OTHER PUBLICATIONS

Extended European Search Report for EP15907441 dated May 7, 2019.

(Continued)

*Primary Examiner* — David A. Rogers
(74) *Attorney, Agent, or Firm* — Todd A. Rathe

(57) ABSTRACT

Examples provide an apparatus including a relative pressure sensor that includes a substrate and a cavity in a face of the substrate. The cavity has a floor in the substrate. A passage extends from the cavity. A membrane supports a pressure sensing device and is mounted to the substrate opposite the floor.

20 Claims, 10 Drawing Sheets

(51) Int. Cl.
*G01L 9/00* (2006.01)
*G01L 19/00* (2006.01)

(56) References Cited

U.S. PATENT DOCUMENTS

| | | | |
|---|---|---|---|
| 4,894,698 A * | 1/1990 | Hijikigawa | G01L 9/0098 |
| | | | 257/254 |
| 5,050,431 A | 9/1991 | McDonald | |
| 5,335,550 A | 8/1994 | Satou | |
| 5,500,663 A | 3/1996 | Ujita et al. | |
| 5,502,467 A | 3/1996 | Hoisington | |
| 5,581,038 A | 12/1996 | Lampropoulos | |
| 5,583,545 A | 12/1996 | Pawlowski, Jr. | |
| 6,032,536 A | 3/2000 | Peeters et al. | |
| 6,398,329 B1 | 6/2002 | Boyd et al. | |
| 6,435,638 B1 | 8/2002 | Wilson et al. | |
| 6,490,920 B1 | 12/2002 | Netzer | |
| 6,554,382 B1 | 4/2003 | Sleger | |
| 6,641,240 B2 | 11/2003 | Hsu | |
| 7,258,005 B2 | 8/2007 | Nyce | |
| 7,399,074 B2 | 7/2008 | Aldrich | |
| 7,625,060 B2 | 12/2009 | Kosugi | |
| 7,661,307 B1 | 2/2010 | Milone | |
| 7,802,471 B2 | 9/2010 | Sieh | |
| 8,075,114 B2 | 12/2011 | Watanabe | |
| 8,373,240 B2 * | 2/2013 | Elian | G01L 19/141 |
| | | | 257/415 |
| 8,487,387 B2 * | 7/2013 | Lin | B81B 7/02 |
| | | | 257/415 |
| 8,522,620 B2 | 9/2013 | Koehler et al. | |
| 8,646,860 B1 | 2/2014 | Jones | |
| 8,714,933 B2 | 5/2014 | Komatsu | |
| 8,740,361 B2 | 6/2014 | Watanabe | |
| 8,740,837 B2 | 6/2014 | Childers | |
| 8,807,716 B2 | 8/2014 | Smith | |
| 8,835,191 B2 * | 9/2014 | Bryant | B82Y 10/00 |
| | | | 257/415 |
| 9,261,395 B2 | 2/2016 | Shearer | |
| 9,358,798 B2 | 6/2016 | Kanbe | |
| 9,488,513 B2 | 11/2016 | Kumar | |
| 9,573,377 B2 | 2/2017 | Gengrinovich | |
| 9,766,144 B2 * | 9/2017 | Brettschneider | B01L 3/502707 |
| 9,962,949 B2 | 5/2018 | Ghozeil | |
| 10,082,414 B2 | 9/2018 | Ge | |
| 10,124,597 B2 | 11/2018 | Alessi | |
| 10,220,630 B2 | 3/2019 | Kanbe | |
| 10,336,089 B2 | 7/2019 | Ghozeil | |
| 2001/0037680 A1 | 11/2001 | Buck | |
| 2002/0029639 A1 * | 3/2002 | Wagner | G01L 9/0042 |
| | | | 73/756 |
| 2003/0056598 A1 | 3/2003 | Kimura et al. | |
| 2005/0241400 A1 * | 11/2005 | Vossenberg | G01L 9/0042 |
| | | | 73/754 |
| 2006/0066659 A1 | 3/2006 | Giovanola et al. | |
| 2006/0144151 A1 | 7/2006 | Krause et al. | |
| 2007/0076066 A1 | 4/2007 | Aldrich | |
| 2008/0088660 A1 | 4/2008 | Lowe | |
| 2008/0099341 A1 | 5/2008 | Giovanola et al. | |
| 2008/0192077 A1 | 8/2008 | Middleton | |
| 2008/0231651 A1 | 9/2008 | Jung | |
| 2009/0036754 A1 | 2/2009 | Pons et al. | |
| 2011/0308324 A1 | 12/2011 | Gamage et al. | |
| 2012/0098898 A1 | 4/2012 | Park | |
| 2014/0015903 A1 | 1/2014 | Gengrinovich | |
| 2014/0204148 A1 | 7/2014 | Ge | |
| 2014/0290373 A1 * | 10/2014 | Brettschneider | B01L 3/502707 |
| | | | 73/700 |
| 2016/0061677 A1 * | 3/2016 | Han | B81B 7/0048 |
| | | | 257/415 |
| 2016/0370242 A1 * | 12/2016 | Duqi | G01L 9/0054 |
| 2017/0284882 A1 * | 10/2017 | Baldo | B81B 3/0021 |
| 2017/0340147 A1 | 11/2017 | Hambrock | |
| 2018/0038754 A1 * | 2/2018 | Marsh | G01L 19/00 |

FOREIGN PATENT DOCUMENTS

| | | |
|---|---|---|
| JP | 05332860 A | 12/1993 |
| JP | 08086711 A | 4/1996 |
| JP | 08226861 A | 9/1996 |
| JP | 08247873 A | 9/1996 |
| JP | 2005091166 A | 7/2005 |
| JP | 2007276374 | 10/2007 |
| TW | 200804781 | 1/2008 |

OTHER PUBLICATIONS

Ink flow, Mar. 10, 2011, <http://www.riso.ro/CC/ComColor%20Queries/ComColor_Tips_Ver6.0/Contents/category/.

* cited by examiner

FIG. 7A
FIG. 7B
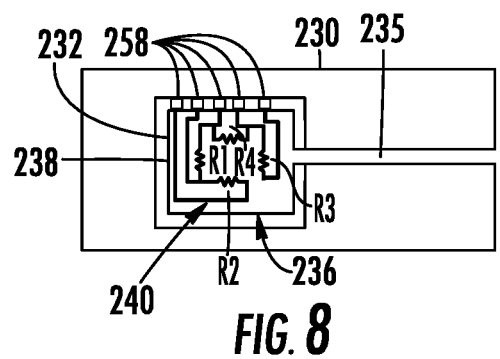
FIG. 8
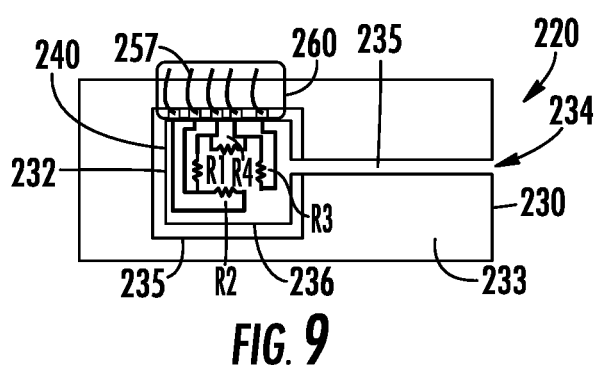
FIG. 9
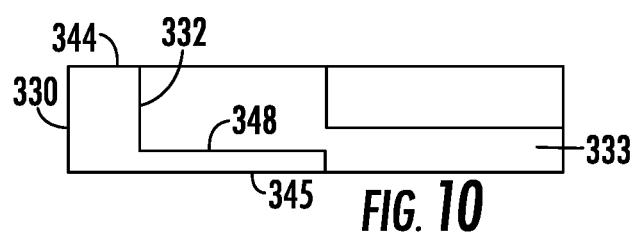
FIG. 10

US 10,753,815 B2

RELATIVE PRESSURE SENSOR

BACKGROUND

Relative pressure sensors are used to sense relative pressure between different regions. Liquid containers, such as ink containers or ink cartridges may include relative pressure sensors to identify excessive pressure within the liquid container.

BRIEF DESCRIPTION OF THE DRAWINGS

FIG. 5A illustrating an example substrate for the example relative pressure sensor.

FIG. 6A illustrating the example substrate of FIG. 5A following application of an example cover over a channel of the substrate and about a cavity of the substrate.

FIG. 7A is a top view of an example pressure sensing die.

FIG. 7B is a sectional view of the example pressure sensing die of FIG. 7A.

FIG. 8 is a top view of an example third stage of the example method for forming the example relative pressure sensor; FIG. 8 illustrating the example substrate of FIG. 6A after mounting of the pressure sensing die of FIG. 7A.

FIG. 9 is a top view of an example fourth stage of the example method for forming the example relative pressure sensor; FIG. 9 illustrating the example substrate of FIG. 8 following wire bonding and encapsulation.

FIG. 10 is a sectional view of another example substrate for forming a relative pressure sensor.

DETAILED DESCRIPTION OF EXAMPLES

Figure 1:
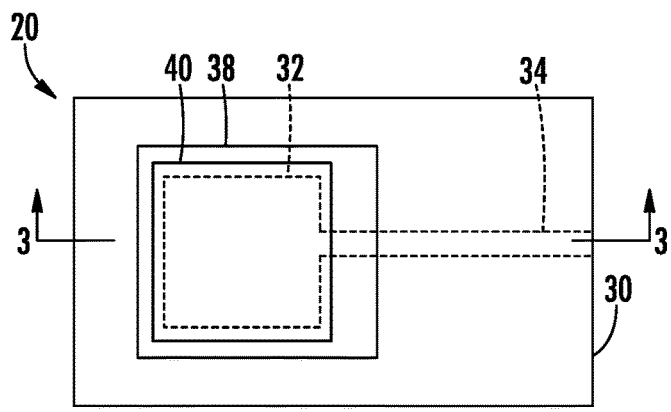
FIG. 1 is a top view of an example relative pressure sensor.

Relative pressure sensors are used to sense relative pressures with respect to different regions Some of the current techniques for forming such relative pressure sensors may be complex and expensive. FIG. 1 illustrates an example relative pressure sensor that is less complex and simpler to manufacture as compared to many currently available relative pressure sensors.

Figure 2:
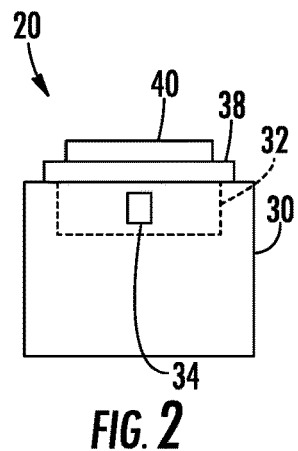
FIG. 2 is an end view of the example relative pressure sensor of FIG. 1.
Figure 3:
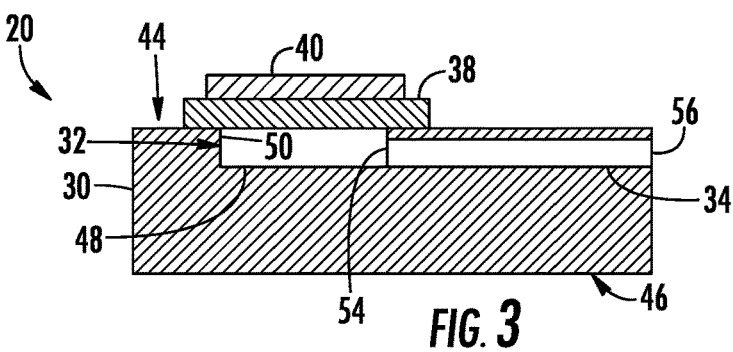
FIG. 3 is a sectional view of the example relative pressure sensor of FIG. 3 taken along line 3-3.

FIGS. 1-3 illustrate an example relative pressure sensor 20. FIG. 1 is a top view of the example relative pressure sensor 20. FIG. 2 is an end view of the example relative pressure sensor 20. FIG. 3 is a sectional view of the example relative pressure sensor FIG. 1 taken along line 3-3. Relative pressure sensor 20 comprises substrate 30, cavity 32, passage 34, membrane 38 and pressure sensing device 40. Substrate 30 comprises a carrier, base or platform for relative pressure sensor 20. Substrate 30 has a body in which are formed cavity 32 and passage 34. Cavity 32 extends into substrate 30 from a face 44 of substrate 30. Cavity 32 has a floor 48 and sidewalls 50. In the example illustrated, sidewalls 50 extend perpendicular to face 44 and perpendicular to the plane containing the major dimensions of membrane 38 and pressure sensing device 40. For purposes of this disclosure, a "major dimension" refers to the largest dimension, length width or height, of an object.

In one implementation, substrate 30 is molded to form cavity 32. In another implementation, substrate 30 undergoes a material removal process, such as micro-machining, to form cavity 32. In one implementation, substrate 30 is formed from a polymer. In one implementation, substrate 30 is formed from a thermoset polymer such as an epoxy molded compound. In one implementation, substrate 30 is formed from, or comprises, a glass, silicon, or other material.

Passage 34 comprises a conduit having a first opening 54 forming a port within cavity 32 and a second opening 56. In one implementation, cavity 32 and the overlying membrane 38 and pressure sensing device 40 are located within a first region while port 56 communicates with a second region, wherein pressure sensing device 40 output signals indicating differences in pressures between the first region and the second region. In the example illustrated, passage 34 extends along a line that lies in a plane that is parallel to the floor 48 of cavity 32. In other implementations, passage 32 may extend to cavity 32 along a line that extends in a plane that is oblique to the floor 48 of cavity 32.

In one implementation, passage 34 comprises a bore drilled or otherwise formed through the body of substrate 30, wherein passage 34 is surrounded on all sides by substrate 30 but for opening 54, 56. In another implementation, as will be described hereafter, passage 34 comprises a groove or channel formed in a face of substrate 30, the channel being bounded by substrate 30 on three sides, wherein a cover is secured to the face of substrate 30 over or opposite to the channel to form the completely bounded or completely surrounded passage 34.

Membrane 38 comprises a panel of a resiliently flexible material. In one implementation, membrane 30 comprises a thin silicon membrane. Membrane 38 is secured to substrate 30 (directly or indirectly) over and across cavity 32 so as to span cavity 32, beyond opposing sidewalls 50, opposite to floor 48. Membrane 38 supports pressure sensing device 40.

Pressure sensing device 40 comprises a device that senses flexing of membrane 30 brought about by differences in pressure being exerted upon the exterior side of membrane 38 in the first region and pressure being exerted upon the interior side of membrane 38, adjacent cavity 32, and in communication with port 56 via passage 34. In one implementation, pressure sensing device 40 comprises a Wheatstone bridge having piezoresistors. In one implementation, portions a membrane 38 are doped to provide piezoresistors and the electrical traces forming the Wheatstone bridge. In other implementations, pressure sensing device 40 may comprise other types of pressure sensing devices. Membrane 38 and pressure sensing device 40, together, form a pressure sensing die, that may be separately formed as a separate unit that is subsequently mounted to substrate 30.

Figure 4:
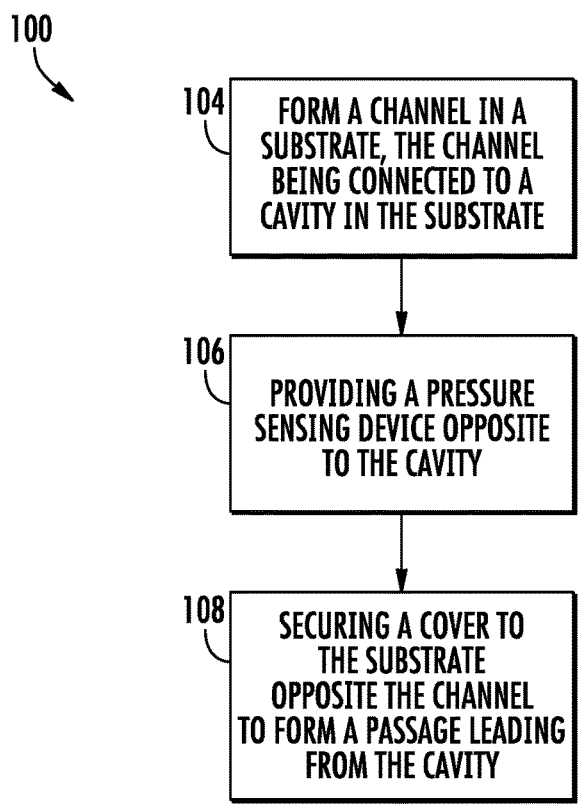
FIG. 4 is a flow diagram of an example method for forming a relative pressure sensor.
Figure 5A:
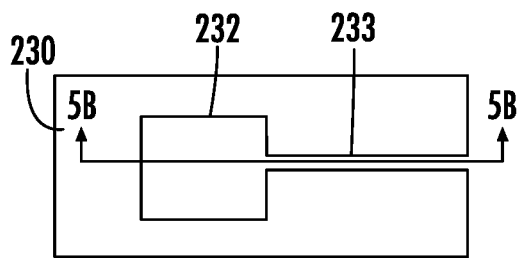
FIG. 5A is a top view of an example first stage of an example method for forming an example relative pressure sensor.
Figure 5B:
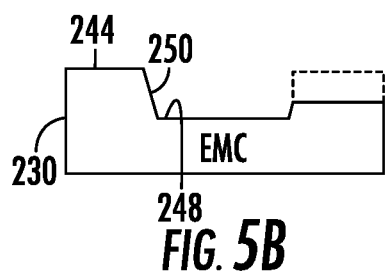
FIG. 5B is a sectional view of the example substrate of FIG. 5A taken along line 5B-5B.
Figure 5C:
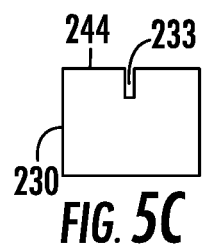
FIG. 5C is an end view of the example substrate of FIG. 5A.

FIG. 4 is a flow diagram of an example method 100 that may be used to form a relative pressure sensor, such as sensor 20 shown in FIGS. 1-3. With respect to method 100, the order of the steps illustrated by blocks 104, 106 and 108 is not limited to the order of the illustrated blocks. As indicated by block 104, a cavity, such as cavity 32, a channel, such as channel 34, is formed in a substrate, such as substrate 30. The channel is formed such that it connects to a cavity, such as cavity 32, also in substrate 30. The channel that is formed is not enclosed on all sides, but comprises a groove extending into a face of the substrate.

As indicated by block 106, a pressure sensing device, such as pressure sensing device 40, is provided opposite to the cavity. In one implementation, the pressure sensing device is supported by a membrane, wherein the membrane is positioned opposite to the cavity, such as opposite to the floor of the cavity within the substrate. As will be described hereafter, in one implementation, block 104 precedes block 106, wherein the pressure sensing device (and membrane) are secured to the substrate after the cavity and the channel have been formed in the substrate. In another implementation, block 104 proceeds block 106, wherein the pressure sensing device (and membrane) are supported by a carrier and wherein the substrate is formed on the carrier over the pressure sensing device (and membrane) and over a sacrificial layer which temporary fills and defines the cavity and the channel in the substrate being formed.

As indicated by block 108, a cover is secured to the substrate opposite the channel to form a passage, such as passage 34, leading to the cavity. In one implementation, the cover may comprise a layer of adhesive, entirely in liquid form, wherein the liquid has a viscosity so as to not completely flow into and fill the channel, but so as to form a ceiling or roof for the channel. In another implementation, the cover may comprise a film adhesive, a film, such as a fabric mesh or a solid polymeric panel or layer that is coated with an adhesive for being secured to the substrate. In one implementation, the cover may comprise a sheet or panel, which upon being sufficiently stimulated or activated, undergoes changes in its physical state so as to adhere, weld, fuse otherwise bonded to the substrate while extending over and across the channel without completely filling the channel. In yet other implementations, the cover may comprise a panel that is fastened, snapped onto, welded or otherwise secured to substrate 40 over the channel.

FIGS. 5-9 illustrate various stages of one example implementation of method 100 being carried out to form the completed relative pressure sensor 220 (shown in FIG. 9). As shown in FIGS. 5A, 5B and 5C a substrate 230 is provided in which cavity 232 and channel 233 are formed. In one implementation, cavity 232 and channel 233 are micro-machined into substrate 230. In another implementation, substrate 230 is molded to form cavity 232 and channel 233 are molded. In one implementation, substrate 230 comprises a polymer, such as a thermosetting polymer, such as an epoxy mold compound. In another implementation, substrate 230 comprises a glass or silicon material.

In the example illustrated, cavity 232 comprises a floor 248 and sidewalls 250. Sidewalls 250 obliquely extend from face 244 of substrate 230 and are also oblique with respect to floor 248. Sidewalls 250 form an acute angle (and angle less than 90°) with respect to the plane of face 244 within cavity 232. Sidewalls 250 form an obtuse angle (an angle greater than 90°) with respect to the plane of floor 248.

Figure 6A:
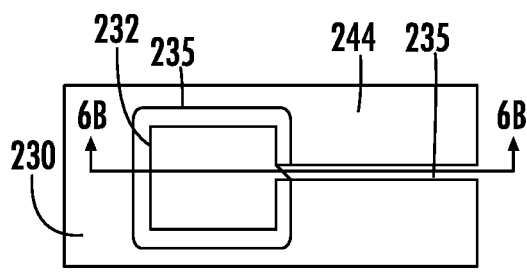
FIG. 6A is a top view of an example second stage of an example method for forming the example relative pressure sensor.
Figure 6B:
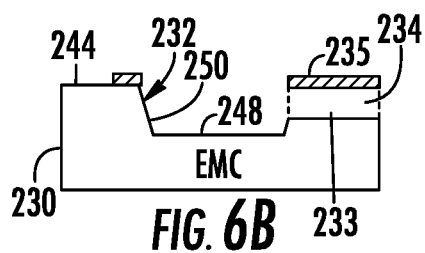
FIG. 6B is a sectional view of the example substrate of FIG. 6A taken along line 6B-6B.
Figure 6C:
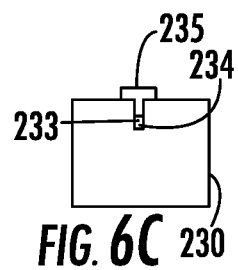
FIG. 6C is an end view of the substrate of FIG. 6A.

As illustrated by FIGS. 6A, 6B and 6C, a cover 235 is secured to substrate 230 opposite to or over channel 233 to form a completely surrounded passage 234. In the example illustrated, the cover comprises a deposit of liquid adhesive over channel 233, wherein the liquid adhesive has a viscosity which inhibits the liquid from completely filling channel 233, leaving passage 234. In the example illustrated, the liquid adhesive applied over channel 233 is further applied to face 244 of substrate 230 about cavity 232, wherein the liquid adhesive the subsequent use to secure the pressure sensing device to substrate 230 over cavity 232, opposite to floor 248 of cavity 232. The liquid adhesive assists in forming a seal between the subsequently mounted pressure sensing device and face 244 of substrate 230. In other implementations, cover 235 may comprise a panel or film coated with an adhesive on opposite faces, wherein the adhesive that is on one face bonds to face 244 of substrate 230 and wherein the adhesive on the other face bonds to a membrane supporting a pressure sensing device. As noted above, in some implementations, the adhesive on either face may be selectively activated through heat, light, chemical interaction or other catalysts.

FIGS. 7A and 7B illustrate one example pressure sensing device. FIGS. 7A and 7B illustrate an example pressure sensing die 236 which comprises membrane 238 and pressure sensing device 240. Membrane 238 is similar to membrane 38 described above. Pressure sensing device 240 is similar to pressure sensing device 40 described above. In the example illustrated, pressure sensing device 240 comprises a Wheatstone bridge having piezoresistors. In other implementations, pressure sensing die 236 may comprise other types of pressure sensing devices 240.

FIG. 8 is a top view illustrating the attachment of die 236 to substrate 230. In the example illustrated, die 236 is secured to face 244 of substrate 230 using the adhesive provided as part of cover 235 extending about cavity 232. In other implementations, a separate application of adhesive, distinct from the application of adhesive forming cover 235, may be employed for securing die 236 to substrate 230. In one implementation, the adhesive is cured to complete the bonding. In the example illustrated, the adhesive forms a seal between die 236 and face 244 of substrate 230.

FIG. 9 is a top view illustrating wire bonding and encapping to complete relative pressure sensor 220. In particular, wire bonds or connections 257 are made to contact pads 258 of pressure sensing device 240. Thereafter, such wire bonds 257 and contact pads 258 are encapsulated by an electrically insulating wire encapsulating material 260 such as a polymeric encapsulating epoxy or other material.

Figure 11:
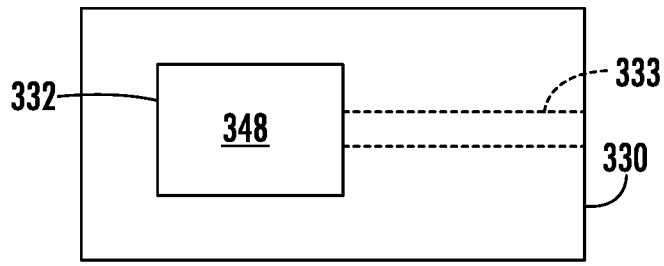
FIG. 11 is a top view of the example substrate of FIG. 10.
Figure 12:
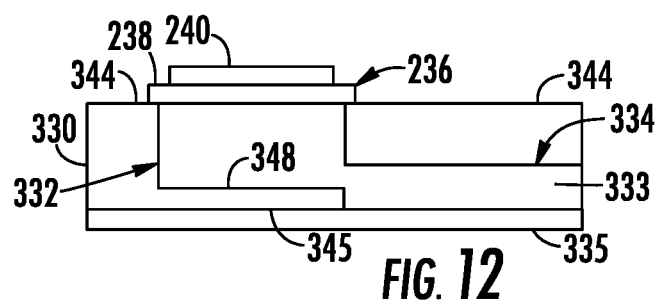
FIG. 12 is a sectional view of an example relative pressure sensor comprising the example substrate of FIG. 10 after mounting of a pressure sensing die and securement of a cover to the example substrate.
Figure 13:
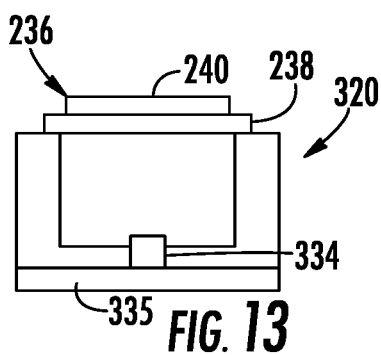
FIG. 13 is an end view of the relative pressure sensor of FIG. 12.

FIGS. 10-13 illustrate another example implementation of the method 100 (shown in FIG. 4) to form the example completed relative pressure sensor 320 shown in FIGS. 12 and 13. As shown by FIGS. 10 and 11, substrate 330 is provided in which cavity 332 and channel 333 are formed. While cavity 332 extends into face 344 of substrate 330, channel 333 extends into face 345 of substrate 330 and communicates with a lower portion of channel 332 at a junction between faces 344, 345. In other implementations, rather than being formed on face 345 which is opposite to face 344, channel 333 may be formed along a side face of substrate 330, between faces 344, 345, and communicating with the interior of cavity 332 at an interior location spaced from each of the faces of substrate 330.

In one implementation, cavity 332 and channel 333 are micro-machined into substrate 330. In another implementation, substrate 330 is molded to form cavity 332 and channel 333. In one implementation, substrate 330 comprises a polymer, such as a thermosetting polymer, such as an epoxy mold compound. In another implementation, substrate 330 comprises a glass or silicon material.

As shown by FIGS. 12 and 13, die 236 (described above) is secured to face 344 of substrate 330 opposite to floor 348 of cavity 332, over and across cavity 332. In one implementation, die 236 is secured to face 344 of substrate 330 by an adhesive that extends between membrane 236 and face 344.

Cover 335 is similar to cover 235 except that cover 335 is secured to face 345 of substrate 330 opposite to channel 333. Cover 335 covers and spans across channel 333 to form the fully surrounded passage 334. In one implementation, cover 335 comprises a deposit of liquid adhesive over channel 333, wherein the liquid adhesive has a viscosity which inhibits the liquid from completely filling channel 333, leaving passage 334. In other implementations, cover 335 may comprise a panel or film coated with an adhesive on one face that bonds to face 345 of substrate 230. As noted above, in some implementations, the adhesive may be selectively activated through heat, light, chemical interaction or other catalysts.

Figure 14:
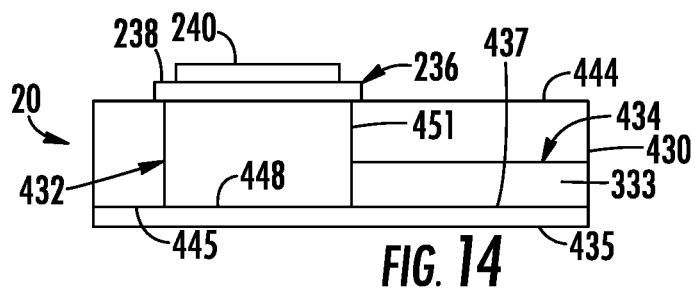
FIG. 14 is a sectional view of another example relative pressure sensor.

FIG. 14 is a sectional view of relative pressure sensor 420, another example implementation of relative pressure sensor 20. Relative pressure sensor 420 is similar to relative pressure sensor 320 except that cavity 332 is replaced with a cavity 432 that is formed by a passage or opening 451 and cover 435. Opening 451 completely extends through substrate 430 from face 444 to face 445. In one implementation, opening 451 is spaced from the perimeter or sides of substrate 230 the same as cavity 332 as shown FIG. 11. Because opening 451 extends completely through substrate 230, opening 451 may be formed by molding or material removal processes without any depth control.

Cover 435 is similar to cover 335 except that cover 435 additionally spans across and covers a lower end of opening 451. As with cover 335, cover 435 is secured to face 445 of substrate 430 opposite to channel 333 so as to form the floor 437 of passage 434. As shown by FIG. 14, cover 445 additionally forms the floor 448 of cavity 432 that extends opposite to membrane 238 and pressure sensing device 240 of pressure sensing die 236. In one implementation, depending on the size of opening 451, cover 435 comprises a deposit of liquid adhesive that continuously extends across or over opening 432, wherein the liquid adhesive has a viscosity which inhibits the liquid from completely filling opening 451, leaving cavity 432. In other implementations, cover 435 may comprise a panel or film coated with an adhesive on one face that bonds to face 445 of substrate 430. As noted above, in some implementations, the adhesive may be selectively activated through heat, light, chemical interaction or other catalysts.

Figure 15:
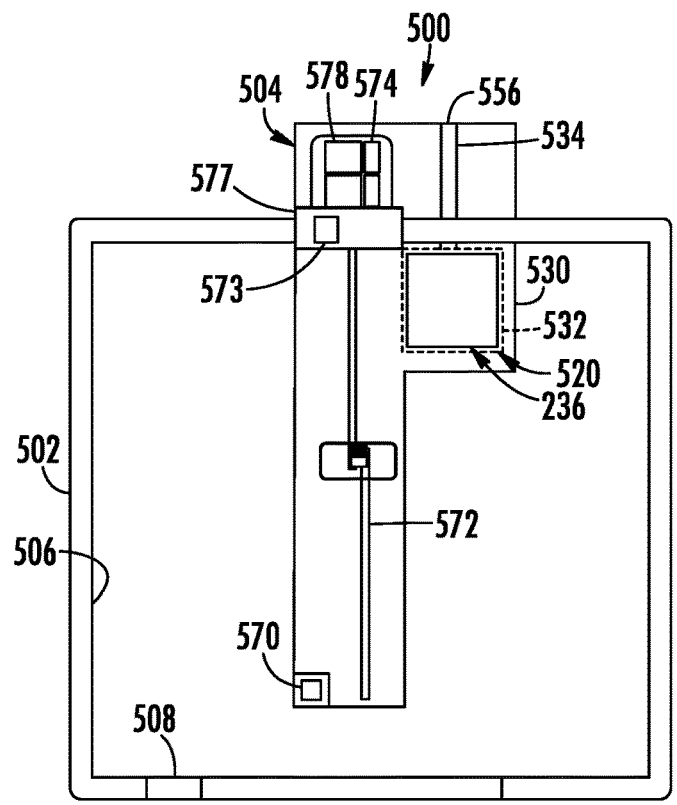
FIG. 15 is a sectional view of an example liquid supply comprising an example sensing unit.

FIG. 15 is a sectional view of an example liquid supply 500 that includes the relative pressure sensor. Liquid supply 500 comprises liquid container 502 and sensing unit 504. Container 502 receives sensing unit 504 and forms an inner chamber 506 and a fluid interface 508. Chamber 506 comprises a volume for receiving or containing a liquid. Fluid interface 508 comprises a port through which liquid is removed from chamber 506. In one implementation, chamber 506 is filled with fluid through port 508. In other implementations, chamber 506 is filled through an alternative port. In one implementation, fluid interface 508 comprises a valve are selectively opening closing support provided by fluid interface 508.

Sensing unit 504 is mounted to container 502, partially extending into chamber 506 to sense characteristics of the liquid and contents of chamber 506. In the example illustrated, sensing unit 504 comprises relative pressure sensor 520, internal pressure sensor 570, liquid level sensor 572 and electrical interconnect 574. Relative pressure sensor 520 may comprise any one of relative pressure sensors 20, 220, 320 or 420 described above. Relative pressure sensor 520 comprises substrate 530, in which cavity 532 and passage 534 are formed, and pressure sensing die 236 described above. Cavity may comprise any of cavities 32, 232, 332 or 432 described above, wherein passage 534 may comprise any of passages 34, 234, 334 and 434 described above. In the example illustrating FIG. 15, cavity 532 and pressure sensing die 236 are located within chamber 506 where passage 534 extends from cavity 532 across the walls of container 502 to port 556 in communication with the environment or ambient air. As a result, relative pressure sensor 520 senses the relative pressure between the interior of chamber 506 and the exterior of container 502. In other implementations, cavity 532 and pressure sensing die 236 may alternatively be supported outside of container 502, whereas port 506 terminates within chamber 506.

Substrate 530 is similar to any of the substrate 30, 230, 330 or 430 described above except that substrate 530 additionally supports internal pressure sensor 570, liquid level sensor 572 and electrical interconnect 574. Internal pressure 570 is supported within container 506 and senses the absolute pressure within container 506. In one implementation, internal pressure sensor 570 comprises a chamber over which a flexible diaphragm supports a pressure sensing device, such as a Wheatstone bridge having piezoresistors.

Liquid level sensor 572 comprises a device projecting into chamber 506 so as to output signals indicating a level of liquid within chamber 506. Electrical interconnect 574 comprises electrical contact pads 578 facilitating electrical connection of each of sensors 520, 570 and 572 to an external controller or computing device. Electrical interconnect 574 is electrically connected to each of sensors 520, 570 and 572 (and to an acumen controller ASIC chip 573) through wire bonding, wherein the wire bonding and the acumen 573 are encapsulated with an encap layer 577. In other implementations, sensors 570 and 572 may be supported independent of substrate 530. In other implementations, sensors 570 and 572 may comprise other forms of internal pressure sensors and liquid level sensors, respectively. In other implementations, electrical interconnect 574 may comprise other forms of communication interfaces. In other implementations, sensors 570 and 572 may be omitted.

Figure 16:
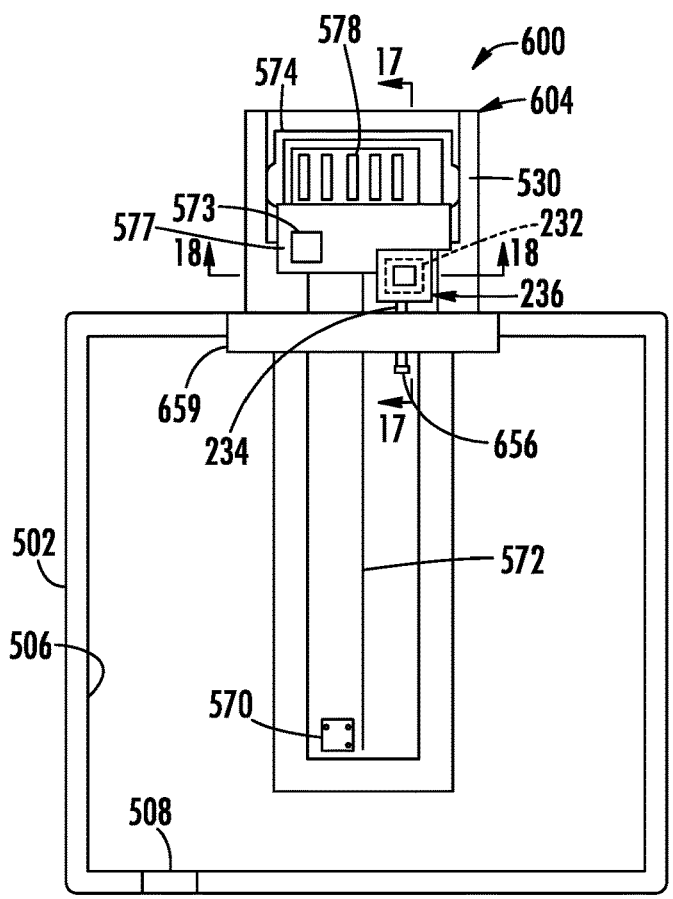
FIG. 16 is a sectional view of another example liquid supply comprising an example sensing unit.
Figure 17:
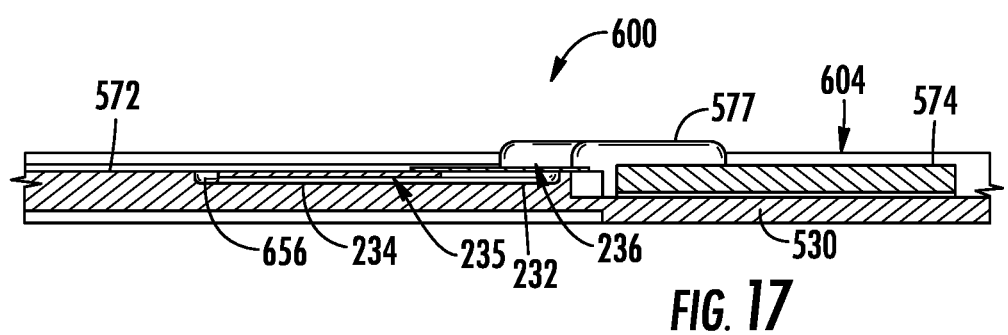
FIG. 17 is a sectional view of the example sensing unit of FIG. 16 taken along line 17-17.
Figure 18:
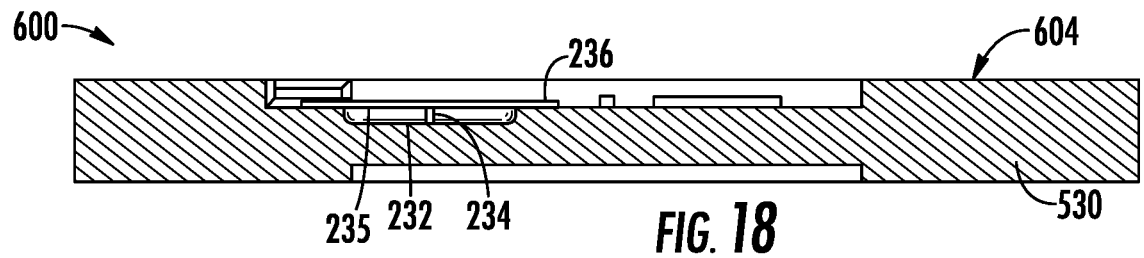
FIG. 18 is a sectional view of the example sensing unit of FIG. 16 taken along line 18-18.

FIG. 16 is a sectional view illustrating another example liquid supply 600. Liquid supply 600 is similar to liquid supply 500 except the liquid supply 600 includes sensing unit 604 in place of sensing unit 504. FIGS. 17 and 18 are sectional views of sensing unit 604. Those components or elements of liquid supply 600 which correspond to components or elements of liquid supply 500 are numbered similarly.

Sensing unit 604 is similar to sensing unit 504 except that substrate 530 supports cavity 232 and pressure sensing die 236 external to chamber 506, whereas passage 534 extends through and across the walls of container 502, terminating at port 656 which is within chamber 506. In the example illustrated, sensing unit 604 is specifically illustrated as comprising relative pressure sensor 230 described above, except that substrate 230 is replaced with substrate 530. Substrate 530 is similar to substrate 230 except that substrate 530 additionally supports sensors 570, 572 and electrical interconnect 574. In other implementations, sensing unit 604 may alternatively comprise any of relative pressure sensors 320 and 420 described above. In the example illustrated, sensing unit 600 comprises a collar 659 that assists in forming a seal between sensing unit 600 and container 502.

Figure 19:
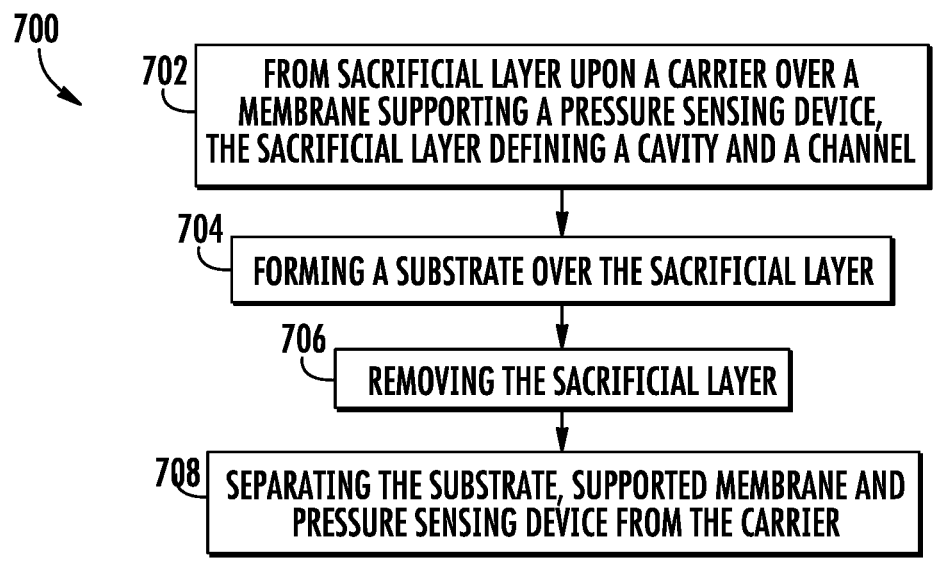
FIG. 19 is a flow diagram of an example method for forming a substrate having a cavity and a channel and positioning a pressure sensing device with respect to the cavity.
Figure 20A:
FIG. 20A is a sectional view of an example first stage of an example method for forming a relative pressure sensor.
Figure 20B:
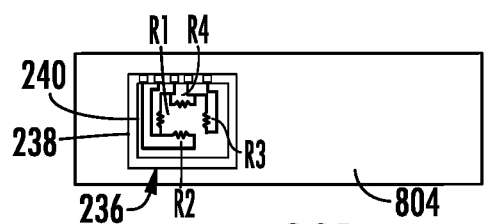
FIG. 20B is a top view of the example first stage shown in FIG. 20A.

FIG. 19 is a flow diagram of an example method 700 for forming the cavity and channel of the above described relative pressure sensors 20, 220 as well as positioning a pressure sensing device relative to the cavity. FIGS. 20-25 illustrate various stages of an example method for forming the completed relative pressure sensor 220 (shown in FIG. 25) pursuant to method 700. FIGS. 20A and 20B illustrate the positioning of pressure sensing die 236 upon a carrier 802. To facilitate subsequent release of die 236 and overlying structures, a release mechanism 804, such as thermal release tape, is positioned upon carrier 802 between carrier 802 and die 236.

Figure 21A:
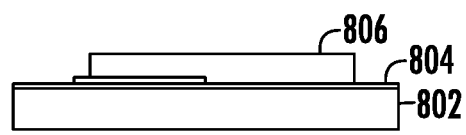
FIG. 21A is a sectional view of an example second stage of the example method for forming the relative pressure sensor.
Figure 21B:
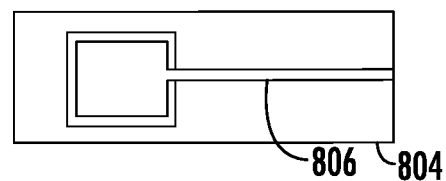
FIG. 21B is a top view of the example stage shown in FIG. 21A.

As indicated by block 702 of method 700 set forth in FIG. 19 and illustrated in FIGS. 21A and 21B, a sacrificial layer 806 is formed upon carrier 802, over membrane 238 supporting pressure sensing device 240. As shown by FIG. 21B, the sacrificial layer 806 is located and shaped so as to have a negative relief pattern defining the subsequently formed cavity 232 and channel 233. In one implementation, the sacrificial layer 806 comprises a layer of lost wax. In other implementations, the sacrificial layer 806 may comprise other sacrificial materials.

Figure 22:
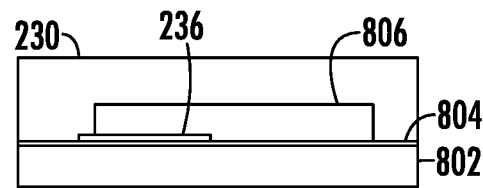
FIG. 22 is a sectional view of an example third stage of the example method for forming the relative pressure sensor.

As indicated by block 704 of FIG. 19 and illustrated in FIG. 22 substrate 230 is formed upon or over the sacrificial layer 806 supported by carrier 802. In one implementation, substrate 230 comprises a polymer that is moldable. In one implementation, substrate 230 comprises an epoxy mold compound that upon curing, forms a solid body.

Figure 23A:
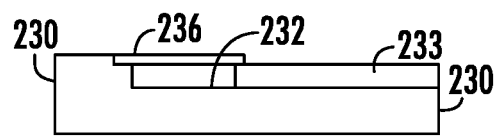
FIG. 23A is a sectional view of an example fourth stage of an example method for forming the relative pressure sensor.
Figure 23B:
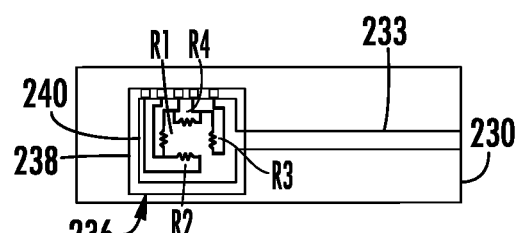
FIG. 23B is a top view of the example fourth stage shown in FIG. 23A.

As indicated by blocks 706 and 708 in FIG. 19 and illustrated by FIGS. 23A and 23B, sacrificial layer 806 is removed and the substrate 230, along with the supported membrane 238 and pressure sensing device 240, forming die 236, are separated from carrier 802. In implementations where sacrificial layer 806 comprises lost wax, the lost wax is melted and drained, developed away by solvent, or otherwise removed. In implementations where the release mechanism 804 comprises a thermal release tape, heat is applied to the tape facilitating such separation. As shown by FIGS. 23A and 23B, removal of the sacrificial layer 806 leaves cavity 232, below pressure sensing die 236, and channel 233.

Figure 24A:
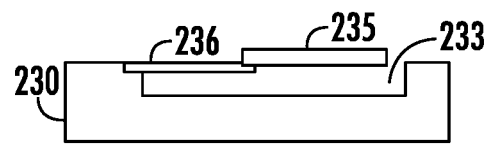
FIG. 24A is a sectional view of an example fifth stage of an example method for forming the relative pressure sensor.
Figure 24B:
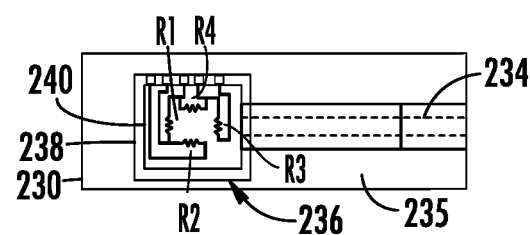
FIG. 24B is a top view of the example fifth stage shown in FIG. 24A.
Figure 25:
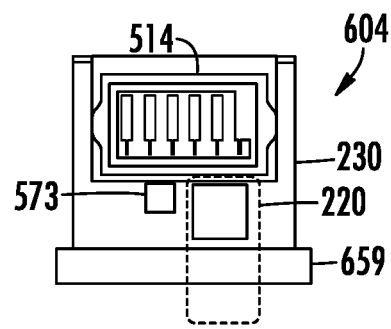
FIG. 25 is a front view of a portion of an example sensing unit including the relative pressure sensor.

As shown by FIGS. 24A and 24B, once cavity 232 and channel 233 have been formed in substrate 230 as described above, the relative pressure sensor 230 is completed by performing steps similar to those illustrated in FIGS. 8 and 9. In particular, cover 235 is formed opposite to channel 233 to complete passage 234. As shown by FIG. 25, in one implementation, relative pressure sensor 220 may be provided as part of sensor unit 604 described above, wherein the substrate formed pursuant to block 704 further supports other sensors such as pressure sensor 570 and liquid level sensor 572 described above with respect to FIG. 16.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. An apparatus comprising:
   a relative pressure sensor comprising:
      a substrate;
      a cavity in a face of the substrate, the cavity having a floor in the substrate;
      a passage extending from the cavity, the passage comprising:
         a channel in the substrate; and
         a cover secured to the substrate opposite the channel, the cover selected from a group of covers consisting of: a film; and an adhesive layer continuously spanning the channel; and
      a membrane supporting a pressure sensing device, the membrane being mounted to the substrate opposite the floor.

2. The apparatus of claim 1, wherein the cover comprises the adhesive layer that continuously spans the channel.

3. The apparatus of claim 1, wherein the cover comprises the film.

4. The apparatus of claim 1, wherein the cavity comprises:
a floor formed by the substrate; and
sidewalls formed by the substrate.

5. The apparatus of claim 4, wherein the membrane has major dimensions extending in a plane and wherein the sidewalls extend perpendicular to the plane.

6. The apparatus of claim 4, wherein the membrane has major dimensions extending in a plane and wherein the sidewalls and the plane form an acute angle within the cavity.

7. The apparatus of claim 1 further comprising a liquid chamber, wherein the passage extends from an interior and an exterior of the liquid chamber.

8. The apparatus of claim 1, wherein the pressure sensing device comprises a Wheatstone bridge having piezoresistors.

9. The apparatus of claim 1, wherein the channel extends into a second face of the substrate opposite the face having the cavity.

10. The apparatus of claim 1, wherein the cover extends across the second face of the substrate with the floor sandwiched between the cover and the cavity.

11. The apparatus of claim 1, wherein the channel extends into the face of the substrate having the cavity.

12. The apparatus of claim 11, wherein the cover extends between the membrane and the substrate.

13. The apparatus of claim 1, wherein the cover consists of the adhesive layer and wherein the adhesive layer is uncovered opposite the channel.

14. The apparatus of claim 1, wherein the cover forms the floor of the cavity opposite the membrane.

15. A method for forming a relative pressure sensor, the method comprising:
forming a channel in a substrate, the channel being connected to a cavity in the substrate;
providing a pressure sensing device opposite to the cavity; and
securing a cover to the substrate opposite the channel to form a passage leading from the cavity, wherein forming the channel in the substrate and providing the pressure sensing device comprise:
forming a sacrificial layer upon a carrier over a membrane supporting the pressure sensing device, the sacrificial layer defining the cavity and the channel;
forming the substrate over the sacrificial layer;
removing the sacrificial layer; and
separating the substrate, the supported membrane and the pressure sensing device from the carrier.

16. The method of claim 15, wherein providing the pressure sensing device comprises mounting a membrane supporting the pressure sensing device to the substrate opposite the cavity in the substrate.

17. The method of claim 15, wherein the channel extends in a plane parallel to a floor of the cavity.

18. The method of claim 15, wherein the membrane has a face opposite the cavity and wherein the cavity has sidewalls that form one of a right angle and an acute angle with respect to the face.

19. The method of claim 15, wherein the cover is selected from a group of covers consisting of: a film; and an adhesive layer continuously spanning the channel.

20. A liquid supply comprising:
a liquid chamber;
a relative pressure sensor comprising:
a substrate;
a cavity in the substrate;
a pressure sensing device opposite the cavity; and
a channel in the substrate and connected to the cavity; and
a cover secured to the substrate opposite the channel to form a passage, wherein the passage extends from an interior to an exterior of the liquid chamber, wherein the cover is selected from a group of covers consisting of: a film; and an adhesive layer continuously spanning the channel.

* * * * *